Patented Jan. 2, 1951

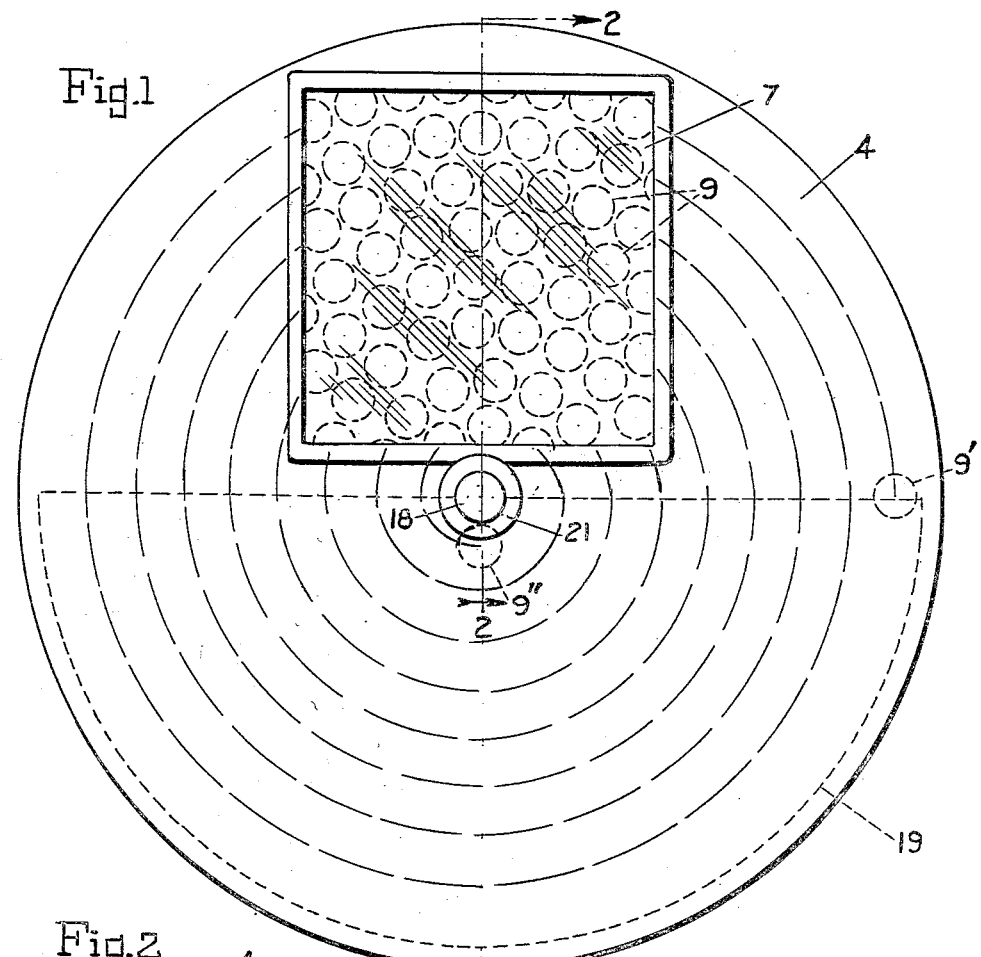
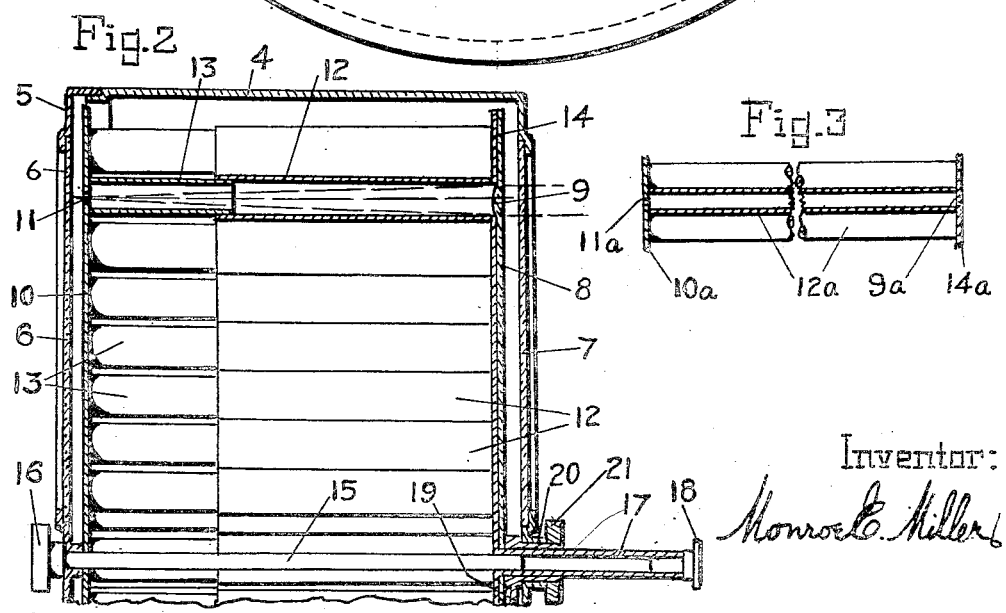

2,536,981

UNITED STATES PATENT OFFICE 2,536,981

OPTICAL PROJECTION APPARATUS

Monroe E. Miller, Washington, D. C.

Application June 14, 1948, Serial No. 32,899

4 Claims. (Cl. 88—24)

This invention relates to optics, and aims to provide a novel method of and means for projecting an image of the same size as the object regardless of the distance between that object and the surface on which the image is produced, such an invention being useful for a camera which gives a full size image on a screen or sensitized surface of an object at various distances away, and also being useful for a magic lantern or stereopticon for projecting a full size image to a screen at various distances away.

The invention is shown in the accompanying drawings, wherein

Figure 1 is a front view of an optical instrument embodying the improvement;

Fig. 2 is a vertical section on the line 2—2 of Fig. 1; and

Fig. 3 is a sectional detail view of a modification.

In carrying out the invention as shown in Figs. 1 and 2, a suitable metal case 4 has a removable back 5 provided with an opening across which extends a glass sheet 6, and has a light-receiving opening in its front registering with the window 6 and across which a sheet of glass 7 extends for making the case dust proof. In the arrangement shown, the windows 6 and 7 are square in shape and are located above the axis of a scanning wheel mounted in the case.

The scanning wheel has a front disk 8 provided with numerous lenses 9, and a rear disk 10 having pinholes 11 coaxial with the lenses. Telescoped tubes 12 and 13 extend from the respective disks 8 and 10 and surround the lenses and pinholes in order to prevent the light from any lens reaching other pinholes that the one for which the lens is intended, or vice versa. The inner surfaces of the tubes are blackened so as to absorb light and prevent unwanted rays from reaching the pinholes or the lenses, depending on the direction the light rays pass through. The disk 8 may be of glass with the lenses 9 integral therewith, and the disk 10 is of metal and is secured to the tubes 13. The tubes 12 are secured to a metal disk 14 in back of the disk 8 and having openings for the lenses.

The scanning means thus described comprises numerous light projectors having their axes parallel with the axis of rotation about which they are arranged as compactly as possible, in order to be moved transversely of their axes between the windows 6 and 7. Maximum compactness is obtained by arranging the lenses in a spiral beginning with the outermost lens 9' and running to the innermost lens 9", as shown by dash lines in Fig. 1, with such lines interrupted for the lenses which are between the windows 6 and 7 as shown in dotted lines. The lenses of the individual projectors are such as to converge the lines of light rays rearwardly from the lenses through the pinholes, and forwardly to any distance from the lenses, within a practical limit for which the instrument is built.

A shaft 15 extends through and is secured to the disk 10, is mounted for rotation in the back of the case, and has a detachable knob 16 on its rear terminal for conveniently rotating the scanning wheel. The forward terminal of the shaft 15 is telescoped into a tubular stem 17 which extends beyond the front of the case and has a knob 18 for sliding the lens disk 8 forwardly and rearwardly, the stem being secured to the disk 14.

A semicircular shutter 19 is disposed immediately behind the front of the case, and is carried by a tubular stud 20 extending through and rotatable in the front of the case and having a knob 21 for conveniently turning the shutter. The stem 17 slides and turns in the stud 20.

In using the device as a camera for obtaining an image of an object, the inner surface of the glass sheet 6 provides a screen in being frosted or coated with fluorescent material. The scanning wheel is rotated by hand or by any suitable means provided for that purpose, and the lenses are adjusted to bring out the image on the screen. The case or supporting means 4 is placed so the projectors are supported parallel with lines extending between the object and the screen. Each individual projector of the scanning wheel projects a dot image of the object through the respective pinhole 11 to the screen, and these dot images move along arcuate lines across the screen, thereby producing parallel image stripes across the screen. The intersections of the focal lines of the projectors with the image-receiving surface of the screen are moved completely across an area of said surface so each dot image is moved likewise and produces a continuous image stripe in or on said surface extending from one edge of said area to the opposite edge thereof. In any position of the scanning wheel there are numerous dot projectors in front of the screen, as shown in Fig. 1, and the rotation of the wheel brings them all into action in succession as they are moved parallel to their axes about the axis of the shaft 15. The center lines of movement of the successive dot projectors are spaced apart but are closely associated so the stripes produced by the moving dot images cover the entire surface of the screen. Such dot images are of brightness corresponding with the dots of the object with which they are in line, and the stripes formed by the moving dots vary in intensity and color values as in any image produced by a lens. Though the center lines of the parallel image stripes are spaced apart these stripes may overlap so they cover the entire image area of the screen. The image stripes jointly produce a composite image of the object. The production of the image corresponds with the scanning of the object, and regardless of how far away the object is, within practical limitation, the image is of full size. Thus, the device may be used in lieu of a telescope for obtaining a full size view or picture of a distant object.

For making a photograph, a sensitized film or plate is introduced into the space between the screen or glass 6 and the disk 10, and the shutter 19 is turned to shut out light and make the proper exposure while the scanning wheel is rotated. The device can be used for copying pictures and other illustrations accurately in full size, the device being unique on account of all lines of projection being for focal axes lines parallel from the object to the image presented. This feature also makes the device of advantage for elevations, plan views, and isometrical and similar views of objects, which cannot be done by the usul type of camera having a single lens. In using the device for making photographic exposures of films or plates, a suitable cover is used for the window 6 so as to shut out light, and any suitable mechanism can be provided for operating the shutter.

When the device is used for a magic lantern or stereopticon, the glass 6 is clear, and a slide is moved behind the disk 10 in front of said window and serves as the object. Light from in rear passes through the slide and the pinholes 11, from which it is projected as dots of proper brilliancy and light values to a screen in front, the lens disk 8 being adjusted to obtain a proper focus of the dot images produced on the screen which jointly provide the composite image. This image is of the same size as the slide regardless of the distance to the screen, and, therefore, the image can be projected to a much farther distance than one which increases in size due to diverging rays.

Fig. 3 shows a simplified form of the device wherein pinholes 9a are provided in the front disk 14a instead of using the disk 8. Such pinholes eliminate the need for focusing, and the tubes 12a connect the front and rear disks or plates 14a and 12a, respectively. With this arrangement the tubes need not be much larger in diameter than the pinholes, and the tubes can be more numerous and more closely associated than with the use of lenses. With the pinholes 9a and 11a the pinhole projectors accomplish the same results as the lens projectors hereinbefore described.

The case 4 may be provided with any well known means for the use of films or plates, and various changes can be made within the scope of the claims which follow.

What is claimed is:

1. The method of projecting an image consisting in supporting parallel optical dot image projectors parallel with lines between an object and an area of a surface adapted to receive an image, and moving said projectors transversely of said lines so as to move in succession between said object and area and so the dot image of each projector produces a continuous image stripe on said surface from one edge of said area to the opposite edge, with said projectors so arranged that the center lines of the image stripes produced by the respective projectors are spaced apart, parallel and close together so the stripes jointly produce a full size image of the object.

2. The method according to claim 1 wherein the projectors are rotated about an axis at different distances therefrom.

3. A scanning device for projecting an image comprising supporting means and parallel optical dot image projectors supported thereby to be positioned parallel with lines between an object and an area of a surface adapted to receive an image, said projectors being movable with respect to the supporting means so as to move in succession between said object and area and so the dot image of each projector produces a continuous image stripe on said surface from one edge of said area to the opposite edge, said projectors being so arranged that the center lines of the image stripes produced by the respective projectors are spaced apart, parallel and close together so the stripes jointly produce a full size image of the object.

4. A scanning device according to claim 3 wherein the projectors are supported for rotation about an axis and are spaced different distances from said axis.

MONROE E. MILLER.

REFERENCES CITED

The following references are of record in the file of this patent:

UNITED STATES PATENTS

| Number | Name | Date |
|---|---|---|
| 379,092 | Baynes | Mar. 6, 1888 |
| 1,330,604 | Nolan | Feb. 10, 1920 |
| 1,420,440 | Moorhouse | June 20, 1922 |
| 1,481,288 | Jenkins | Jan. 22, 1924 |
| 1,751,584 | Hansell | Mar. 25, 1930 |
| 1,848,814 | Allen | Mar. 8, 1932 |
| 1,854,665 | Parker | Apr. 19, 1932 |
| 2,122,750 | Nicolson | July 5, 1938 |
| 2,138,089 | Cawley | Nov. 29, 1938 |
| 2,354,591 | Goldsmith | July 25, 1944 |

FOREIGN PATENTS

| Number | Country | Date |
|---|---|---|
| 333,198 | Great Britain | Aug. 6, 1930 |